United States Patent
Lightstone et al.

(10) Patent No.: US 11,936,598 B2
(45) Date of Patent: Mar. 19, 2024

(54) SIGNAL INJECTION IN TIME DIVISION DUPLEX (TDD) COMMUNICATION SYSTEMS

(71) Applicant: Telefonaktiebolaget LM Ericsson (publ), Stockholm (SE)

(72) Inventors: Leonard Lightstone, Ottawa (CA); Christian Braun, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 216 days.

(21) Appl. No.: 17/056,588

(22) PCT Filed: Aug. 24, 2018

(86) PCT No.: PCT/IB2018/056445
§ 371 (c)(1),
(2) Date: Nov. 18, 2020

(87) PCT Pub. No.: WO2020/039235
PCT Pub. Date: Feb. 27, 2020

(65) Prior Publication Data
US 2021/0376992 A1    Dec. 2, 2021

(51) Int. Cl.
*H04L 5/14* (2006.01)
*H04B 17/11* (2015.01)
*H04W 72/0446* (2023.01)

(52) U.S. Cl.
CPC .............. *H04L 5/14* (2013.01); *H04B 17/11* (2015.01); *H04W 72/0446* (2013.01)

(58) Field of Classification Search
CPC ........................................................ H04L 5/14
See application file for complete search history.

(56) References Cited

U.S. PATENT DOCUMENTS 11,140,695 B1 * 10/2021 Eyuboglu ........... H04W 72/535
2012/0087230 A1 * 4/2012 Guo ..................... H04B 7/0413
                                                                370/208

(Continued)

FOREIGN PATENT DOCUMENTS

EP    2416507 A1    2/2012
EP    2590333 A2    8/2013

(Continued)

OTHER PUBLICATIONS

International Search Report and Written Opinion dated May 14, 2019 issued in PCT Application No. PCT/IB2018/056445, consisting of 14 pages.

(Continued)

*Primary Examiner* — Jason E Mattis
(74) *Attorney, Agent, or Firm* — Christopher & Weisberg, P.A.

(57) ABSTRACT

According to one aspect of the disclosure, a radio node for Time Division Duplex, TDD, communications is provided. The radio node includes processing circuitry configured to inject a signal into a time window where the time window is positioned, in a time domain, between a TDD first direction subframe to a TDD second direction subframe and the time window has a time duration less than the TDD first direction subframe and TDD second direction subframe, and perform at least one function using the injected signal.

19 Claims, 5 Drawing Sheets

(56) References Cited

U.S. PATENT DOCUMENTS

| | | | |
|---|---|---|---|
| 2013/0107765 A1* | 5/2013 | He | H04B 1/30 370/280 |
| 2014/0334392 A1* | 11/2014 | Gage | H04L 5/0092 370/329 |
| 2016/0233904 A1 | 8/2016 | Wu et al. | |
| 2018/0014300 A1* | 1/2018 | Jitsukawa | H04L 5/14 |
| 2019/0036559 A1* | 1/2019 | Wu | H04J 11/0023 |

FOREIGN PATENT DOCUMENTS

| | | |
|---|---|---|
| WO | 2010/103048 A1 | 9/2010 |
| WO | 2018/203104 A1 | 11/2018 |

OTHER PUBLICATIONS

3GPP TS 38.104 V0.0.2 (May 2017) 3rd Generation Partnership Project; Technical Specification Group Radio Access Network; NR; Base Station (BS) Radio Transmission and Reception (Release 15), consisting of 17 pages.

3GPP TS 38.211 V0.0.0 (May 2017) 3rd Generation Partnership Project; Technical Specification Group Radio Access Network; NR; Physical Channels and Modulation (Release 15), consisting of 10 pages.

3GPP TS 36.104 V15.0.0 (Sep. 2017) 3rd Generation Partnership Project; Technical Specification Group Radio Access Network; Evolved Universal Terrestrial Radio Access (E-UTRA); Base Station (BS) Radio Transmission and Reception (Release 15), consisting of 243 pages.

3GPP TS 36.211 V15.0.0 (Dec. 2017) 3rd Generation Partnership Project; Technical Specification Group Radio Access Network; Evolved Universal Terrestrial Radio Access (E-UTRA); Physical Channels and Modulation (Release 15), consisting of 219 pages.

* cited by examiner

SIGNAL INJECTION IN TIME DIVISION DUPLEX (TDD) COMMUNICATION SYSTEMS

CROSS-REFERENCE TO RELATED APPLICATIONS

This application is a Submission Under 35 U.S.C. § 371 for U.S. National Stage Patent Application of International Application Number: PCT/IB2018/056445, filed Aug. 24, 2018 entitled "SIGNAL INJECTION IN TIME DIVISION DUPLEX (TDD) COMMUNICATION SYSTEMS," the entirety of which is incorporated herein by reference.

TECHNICAL FIELD

Wireless communications and in particular, to injecting a signal into a time window for performing at least one function based on the injected signal.

BACKGROUND

Antenna Calibration (AC)

Advanced wireless systems, particularly in one or more wireless communication standards such as one or more releases of the $3^{rd}$ Generation Partnership Project (3GPP) Long Term Evolution (LTE) and the $5^{th}$ Generation (5G) (also referred to as "New Radio" (NR)) technologies, include adaptive antenna systems (AAS) as a technology for improving cellular performance and capacity.

In AAS, the antenna elements may continuously be calibrated so that digital beamforming can be reliably performed. Calibration of the antenna elements may need to be performed in either the downlink (i.e., base station/first radio node transmitting) or uplink (i.e., base station/first radio node receiving) direction, or both.

Typically, calibration of antenna elements may be performed by periodically sending a predefined or known signal or signal pattern (i.e., training data) to the antenna. The signal as transmitted (or received) by the antenna is detected through the use of special circuitry. The detected signal is compared with the known or predefined training data for determining antenna induced errors. Correction weights or functions are determined based on these errors. The required correction weights/functions are then applied in the data path so that the signals transmitted from the antenna (or received from the antenna) are near error-free. The training signal may cover the full bandwidth of the cell, but one or more of the remaining details of the training data—for example contiguity in frequency and/or time—can be designed as part of the calibration procedure itself.

The frequency with which the calibration operation may be performed depends on the stability of the components in the radio/antenna system as well as the variability of the environment that the system experiences. Further, the production of low cost systems may translate into poorer quality (i.e., less stable) components, which may lead to a higher frequency of calibration operations being performed.

A problem introduced by the use of antenna calibration training data is that this data may use some of the same time-frequency resources as those intended for existing signals such as for transmitting second radio node data, e.g., shared channel (SCH) data. As a result, the inclusion of the antenna calibration training data may negatively impact cell performance since it reduces available resources for transmission. However, the overall benefits of AAS are such that the net result of using AAS is improved cell performance relative to not using AAS. Nevertheless, AAS still has room for improvement in order to help achieve better cell performance with AAS.

SUMMARY

Some embodiments advantageously provide a method and radio node for injecting a signal into a time window for performing at least one function. For example, the time window may be part of an offset time window or offset region that is used for time division duplex (TDD) realignment. In one or more embodiments, by adding new functionality to an existing time window, arrangements described herein are able to inject a signal for the purpose of performing at least one function (e.g., antenna calibration) without impacting and/or negatively affecting the data throughput. This is the case because the injected signal may not use resources otherwise available for communication.

The teachings of the disclosure described herein take advantage of the unused time window available on transition from uplink (UL) to downlink (DL) transmission to accomplish signal injection without impacting TDD traffic. The injected signals may be used for different applications including antenna calibration, antenna branch monitoring, voltage standing wave radio (VSWR) detection, inter-station communication, etc.

Some advantages that the teachings of the disclosure provide include:

1. Ability to inject signals in the DL path without impacting DL traffic or system capacity.
2. The injected signals can potentially be applied to a variety of applications.

According to one aspect of the disclosure, a radio node for Time Division Duplex, TDD, communications is provided. The radio node includes processing circuitry configured to inject a signal into a time window where the time window is positioned, in a time domain, between a TDD first direction subframe to a TDD second direction subframe and the time window has a time duration less than the TDD first direction subframe and TDD second direction subframe, and perform at least one function using the injected signal.

According to one embodiment of this aspect, the radio node is one of a base station and user equipment. According to one embodiment of this aspect, the time window is part of an offset region that includes a time period in which the radio node (16, 22) can switch between a receiving mode and a transmitting mode. According to one embodiment of this aspect, the injection of the signal into the time window occurs after the time period in which the radio node (16, 22) can switch between a receiving mode and a transmitting mode.

According to one embodiment of this aspect, the offset region is defined by a transition from the TDD first direction subframe to TDD second direction subframe. According to one embodiment of this aspect, the at least one function includes one of an internal operation of the radio node and an external operation of the radio node. According to one embodiment of this aspect, the internal operation of the radio node includes at least one of an antenna calibration, antenna branch monitoring and Voltage Standing Wave Ratio, VSWR, detection.

According to one embodiment of this aspect, the external operation of the radio node includes at least one over-the-air based operation with at least one cooperating node. According to one embodiment of this aspect, the signal is injected into the time window without overwriting radio access technology user or control data to be transmitted by the radio node. According to one embodiment of this aspect, the first direction is an uplink or downlink direction, the second direction being opposite the first direction.

According to another aspect of the disclosure, a method for a radio node for Time Division Duplex, TDD, communications is provided. A signal is injected into a time window where the time window is positioned, in the time domain, between a TDD first direction subframe to a TDD second direction subframe and the time window has a time duration less than the TDD first direction subframe and the TDD second direction subframe. At least one function is performed using the injected signal.

According to one embodiment of this aspect, the radio node is one of a base station and user equipment. According to one embodiment of this aspect, the time window is part of an offset region that includes a time period in which the radio node (16, 22) can switch between a receiving mode and a transmitting mode. According to one embodiment of this aspect, the injection of the signal into the time window occurs after the time period in which the radio node (16, 22) can switch between a receiving mode and a transmitting mode.

According to one embodiment of this aspect, the offset region is defined by a transition from the TDD first direction subframe to TDD second direction subframe. According to one embodiment of this aspect, the at least one function includes one of an internal operation of the radio node and an external operation of the radio node. According to one embodiment of this aspect, the internal operation of the radio node includes at least one of an antenna calibration, antenna branch monitoring and Voltage Standing Wave Ratio, VSWR, detection.

According to one embodiment of this aspect, the external operation of the radio node includes at least one over-the-air based operation with at last one cooperating node. According to one embodiment of this aspect, the signal is injected into the time window without overwriting radio access technology user or control data to be transmitted by the radio node. According to one embodiment of this aspect, the first direction is an uplink direction, the second direction being opposite the first direction.

According to another aspect of the disclosure, a radio node for Time Division Duplex, TDD, communications is provided. The radio node includes processing circuitry configured to: inject a downlink antenna calibration signal into a time window where the time window is positioned, in a time domain, between a TDD uplink subframe to a TDD downlink subframe and the time window has a time duration less than the TDD uplink subframe and TDD downlink subframe, and perform at least one antenna calibration function using the injected signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
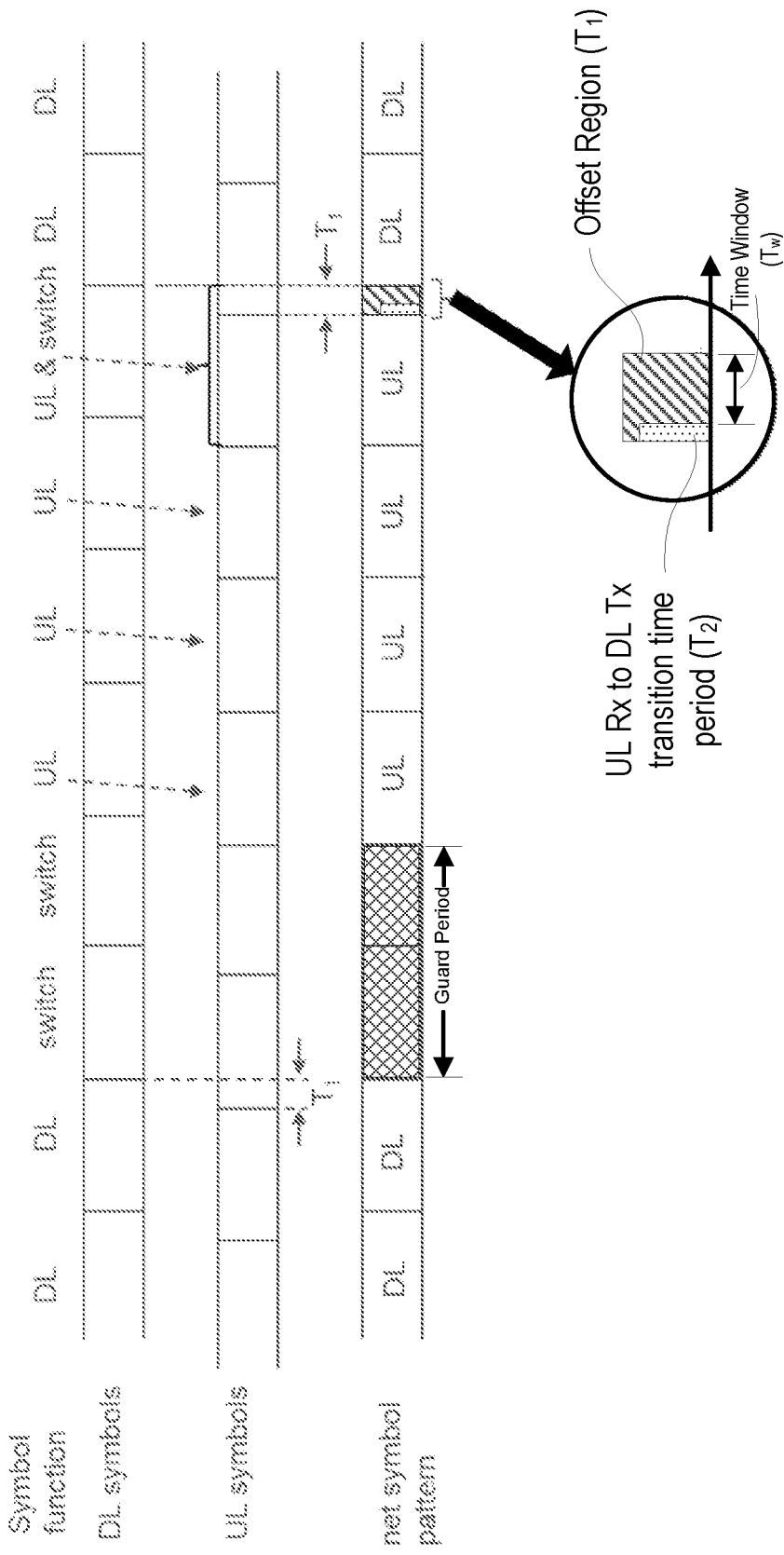
FIG. 1 is a block diagram of Time Division Duplex (TDD) timing according to one or more wireless communication standards.

In adaptive antenna systems (AAS), one approach for antenna calibration is to intelligently schedule downlink (DL) calibration signal data mixed in with the "true" DL data or actual data to be transmitted to a second radio node such as a UE or other entity in the system. This approach involves a medium access control (MAC) scheduler, which may complicate the design of this approach. This approach uses available resources in the UL/DL subframe to carry calibration signal data. Furthermore, different wireless communication standards allow different degrees of flexibility with which to use transmission time interval (TTI) symbols for purposes other than to carry traffic, which may also complicate the design of this approach.

When antenna calibration (AC) does not occur too often or if cells are only lightly loaded with traffic, it may be acceptable to steal subframes and dedicate these subframes to carry the AC training data. For example, AC not occurring too often may be acceptable, even if resources are taken away from data traffic, since the average impact may not be materially important because traffic is impacted so infrequently. Similarly, a lightly loaded cell will have lots of unused traffic resources available such that resources may be intelligently repurposed for calibration with no impact on the user experience at the wireless device. In other words, no downlink shared channel (DLSCH) may be transmitted in a stolen subframe, or in portions of that subframe. However, this approach may cause noticeable cell capacity degradation when AC actions are frequent and/or cell loading is high such as in cases where too many subframes are being stolen for AC data and/or where there are just not many, if any subframes, to steal for AC data.

Another approach for antenna calibration is a brute force approach that punctures (overwrites) the AC training data into existing user data in the orthogonal frequency division multiplexing (OFDM) subframe. This approach will result in an increase in signal-to-interference plus noise ratio (SINR) of the received signal and may, in turn, result in the signal not being decodable by the second radio node. If the signal is not decodable, retransmission of the signal may be required, which may have the effect of lowering cell throughput and increasing response latency. In one example, the link adaption behavior may be modified to compensate for the puncturing of user traffic.

In all of the above approaches, DL user traffic capacity is negatively impacted. The disclosure helps solve at least one of the problems with existing approaches in which the disclosure generally relates to inserting downlink (DL) antenna calibration training signals in such a way that the insertion has no impact on data throughput performance.

Other Motivations for Signal Injection There can also be reasons other than antenna calibration to want to inject signals that may not be wireless communication standard specific. For example, these signals, i.e., injected signals, can be used for purposes of internal equipment maintenance (such as antenna branch checking, voltage standing wave radio (VSWR) checking) or inter-node communication over the air, among other uses described herein and/or in accordance with the teachings of the disclosure.

Time Division Duplex (TDD) Pattern Structures

In time division duplex (TDD) technologies, the transmit and receive, or downlink (DL) and uplink (UL) transmissions share the same communication medium and frequency range in a time shared fashion such that the medium is used in one communication direction at a time. A node, e.g., base station and/or user equipment, may require a "guard period" (GP) when switching from receive mode to transmit mode or vice versa. This guard period may help accomplish two functions:

1. Provides time for the internal circuitry of the radio node to switch between the two modes. During this switch-over interval, the node can neither transmit nor receive. In one or more embodiments, internal circuitry may refer to at least one of processing circuitry, at least one antenna, at least one antenna chain circuitry and other internal component(s) of a radio node that are used to provide transmit and/or receive functionality.
2. Provides time for signals from other nodes (if present) to dissipate to the point where these signals generate negligible interference when the receiver is turned on. For example, base station DL transmissions from an adjacent cell at a distance R may be received a time R/c (where c=speed of light) after the DL transmissions have actually ceased.

In one or more wireless communication standards such as Long Term Evolution (LTE) and New Radio (NR) (4G and 5G) OFDM radio access technologies, the system may use a centralized scheduling approach with a fixed, or semi-dynamically configured TDD pattern. The UL and DL structures are offset in time as shown in FIG. 1 where the offset region has a duration of $T_1$. The offset duration values are provided in table below.

| ACCESS TECHNOLOGY | FREQUENCY RANGE | $T_1$ [μs] |
|---|---|---|
| LTE | All | 20.31 |
| NR | Low to mid-band | 13.0 |
| NR | High band (mW) | 7.0 |

In FIG. 1, the top row illustrates the desired function of each particular symbol, i.e., symbol function row. The next row illustrates a frame structure consisting of 100% DL symbols. The following row illustrates a frame structure consisting of 100% UL symbols, but is offset in time with respect to the DL pattern (as may be required by one or more wireless communication standards such as Third Generation Partnership Project (3GPP) standards). The final row illustrates the combined TDD pattern.

As shown in FIG. 1, the result of the time offset between DL and UL is as follows:
  On transition from DL to UL, one of the symbols is shorter in duration than other symbols. This shorter symbol is not actively used, but serves as part of the guard period illustrated in FIG. 1.
  On transition from UL to DL, there is a small time window or offset region ($T_1$) of "extra time" introduced in order to accomplish realignment with the DL pattern where the offset region provides a time period for transition between the receiving mode and the transmitting mode.

The minimum requirement for the duration of the transient behavior (i.e., Function 1 described above) when switching from DL to UL, and UL to DL may be provided by one or more wireless communication standards. Example values are provided in Table 1 and Table 2, produced below. Note that these values in Tables 1 and 2 may be the maximum allowable transition times. Equipment may exceed (i.e., have shorter transition times) than these performance specifications.

TABLE 1

Minimum requirements for the transmitter transient time period for LTE

| Transition | Transient time period length ($T_2$) [us] |
|---|---|
| OFF to ON | 17 |
| ON to OFF | 17 |

TABLE 2

Minimum requirements for the transmitter transient time period for NR FR1 (=450 MHz-6000 MHz)

| Transition | Transient time period length ($T_2$) [us] |
|---|---|
| OFF to ON | 10 |
| ON to OFF | 10 |

During the transition from UL to DL, the DL emissions limits may be the same as in the regular portion of the DL symbol such as to allow for transmissions over the air.

Therefore, the offset region provides time for transition from UL receiving to DL transmission and also allows for realignment, i.e., is used as a waiting period before downlink communications are initiated. However, this offset region is not used, in existing systems, to communicate, transmit and/or receive signals. The disclosure advantageously modifies how this offset region is used without negatively affecting throughput.

Before describing in detail exemplary embodiments, it is noted that the embodiments reside primarily in combinations of apparatus components and processing steps related to injecting a signal into a time window for performing at least one function based on the injected signal. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "first radio node" used herein can be any kind of radio node comprised in a radio network which may further comprise any of base station, network node, radio base station, base transceiver station (BTS), base station controller (BSC), radio network controller (RNC), evolved Node B (eNB or eNodeB), Node B, gNB, multi-standard radio (MSR) radio node such as MSR base station (BS), relay node, donor node controlling relay, radio access point (AP), transmission points, transmission nodes, Remote Radio Unit (RRU) Remote Radio Head (RRH), nodes in distributed antenna system (DAS) etc.

The term "second radio node" may be a radio communication device, user equipment (UE) endpoint, wireless device, mobile endpoint, device endpoint, sensor device, target UE, device-to-device UE, machine type UE or UE capable of machine to machine communication, a sensor equipped with UE, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. In some embodiments described herein, the first radio node and second radio node may be reversed such that the first radio node performs functionality of the second radio node and the second radio node perform functionality of the first radio node. Put another way, the first radio node can be a UE or other wireless device, and the second radio node can be a base station, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a first radio node, in particular a network node, base station, gNB or eNodeB. An uplink direction may refer to a data transfer direction from a second radio node to a first radio node, e.g., network node, eNB, base station, gNB and/or relay station. A downlink direction may refer to a data transfer direction from a first radio node, e.g., base station, network node, eNB, gNB and/or relay node, to a second radio node, e.g., user equipment. UL and DL may be associated to different frequency resources, e.g., carriers and/or spectral bands. A cell may comprise at least one uplink carrier and at least one downlink carrier, which may have different frequency bands. A first radio node, e.g., a network node, base station, gNB or eNB, may be adapted to provide and/or define and/or control one or more cells, e.g., a secondary cell (SCell) and/or a License Assisted Access (LAA) cell.

Configuring a second radio node or user equipment or wireless device or node may involve instructing and/or causing the second radio node or user equipment to change its configuration, e.g., at least one setting and/or register entry and/or operational mode. A second radio node may be adapted to configure itself, e.g., according to information or data in a memory of the second radio node. Configuring a second radio node by another device or node or a network may refer to and/or comprise transmitting information and/or data and/or instructions to the second radio node by the other device or node or the network, e.g., allocation data (which may also be and/or comprise configuration data) and/or scheduling data and/or scheduling grants. Configuring a second radio node may include sending allocation/configuration data to the user equipment indicating which modulation and/or encoding to use. A user equipment may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

While the description is presented primarily in a fourth generation (4G) and fifth generation (5G) wireless cellular context, this gap time and the possibility to exploit it is something that may be present in various TDD systems of different types. Therefore, application of the basic concept should not be restricted to wireless cellular systems.

Note further, that functions described herein as being performed by a second radio node or a first radio node may be distributed over a plurality of second radio nodes and/or first radio nodes. In other words, it is contemplated that the functions of the first radio node and second radio node described herein are not limited to performance by a single physical device and, in fact, can be distributed among several physical devices.

A cell may be generally a communication cell, e.g., of a cellular or mobile communication network, provided by a node such as a first radio node. A serving cell may be a cell on or via which a first radio node/base station (the node providing or associated to the cell, e.g., first radio node, base station, gNB or eNodeB) transmits and/or may transmit data (which may be data other than broadcast data) to a second radio node, in particular control and/or user or payload data, and/or via or on which a second radio node transmits and/or may transmit data to the first radio node; a serving cell may be a cell for or on which the second radio node is configured and/or to which it is synchronized and/or has performed an access procedure, e.g., a random access procedure, and/or in relation to which it is in a radio resource control (RRC)_connected or RRC_idle state, e.g., in case the first radio node and/or second radio node and/or network follow the LTE-standard. One or more carriers (e.g., uplink and/or downlink carrier/s and/or a carrier for both uplink and downlink) may be associated to a cell.

Transmitting in downlink may pertain to transmission from the network or first radio node to the second radio node. Transmitting in uplink may pertain to transmission from the second radio node to the network or first radio node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between first radio nodes, e.g. for wireless backhaul and/or relay communication and/or (wireless) network communication for example between first radio nodes or similar network nodes, in particular communication terminating at such. It may be considered that backhaul and/or relay communication and/or network communication is implemented as a form of sidelink or uplink communication or similar thereto.

Configuring a second radio node or user equipment may involve instructing and/or causing the second radio node to change its configuration, e.g., at least one setting and/or register entry and/or operational mode. A second radio node may be adapted to configure itself, e.g., according to information or data in a memory of the second radio node. Configuring a second radio node by another device or node or a network may refer to and/or comprise transmitting information and/or data and/or instructions to the second radio node by the other device or node or the network, e.g., allocation data (which may also be and/or comprise configuration data) and/or scheduling data and/or scheduling grants. Configuring a second user equipment may include sending allocation/configuration data to the second user equipment indicating which modulation and/or encoding to use. A second user equipment may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g., transmitting, it to one or more other nodes (parallel and/or sequentially), which may transmit it further to the radio node (or another node, which may be repeated until it reaches the second radio node). Alternatively, or additionally, configuring a first radio node, e.g., by a base station or other device, may include receiving configuration data and/ or data pertaining to configuration data, e.g., from another node like a base station, which may be a higher-level node of the network, and/or transmitting received configuration data to the first radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a second radio node may comprise scheduling downlink and/or uplink transmissions for the second radio node, e.g. downlink data and/or downlink control signaling and/or downlink control information (DCI) and/or uplink control or data or communication signaling, in particular acknowledgement signaling, and/or configuring resources and/or a resource pool therefor. In particular, configuring a second radio node (e.g., user equipment) may comprise configuring the second radio node to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise demodulation reference signal (DMRS) according to Third Generation Partnership Project (3GPP, a standardization organization) and/or LTE technologies. Demodulation reference signaling may generally be considered to represent signaling providing reference for a receiving device like a second radio node to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data may refer to any kind of data, in particular any one of and/or any combination of control data or user data or payload data. Control information (which may also be referred to as control data) may refer to data controlling and/or scheduling and/or pertaining to the process of data transmission and/or the network or user equipment operation.

Figure 2:
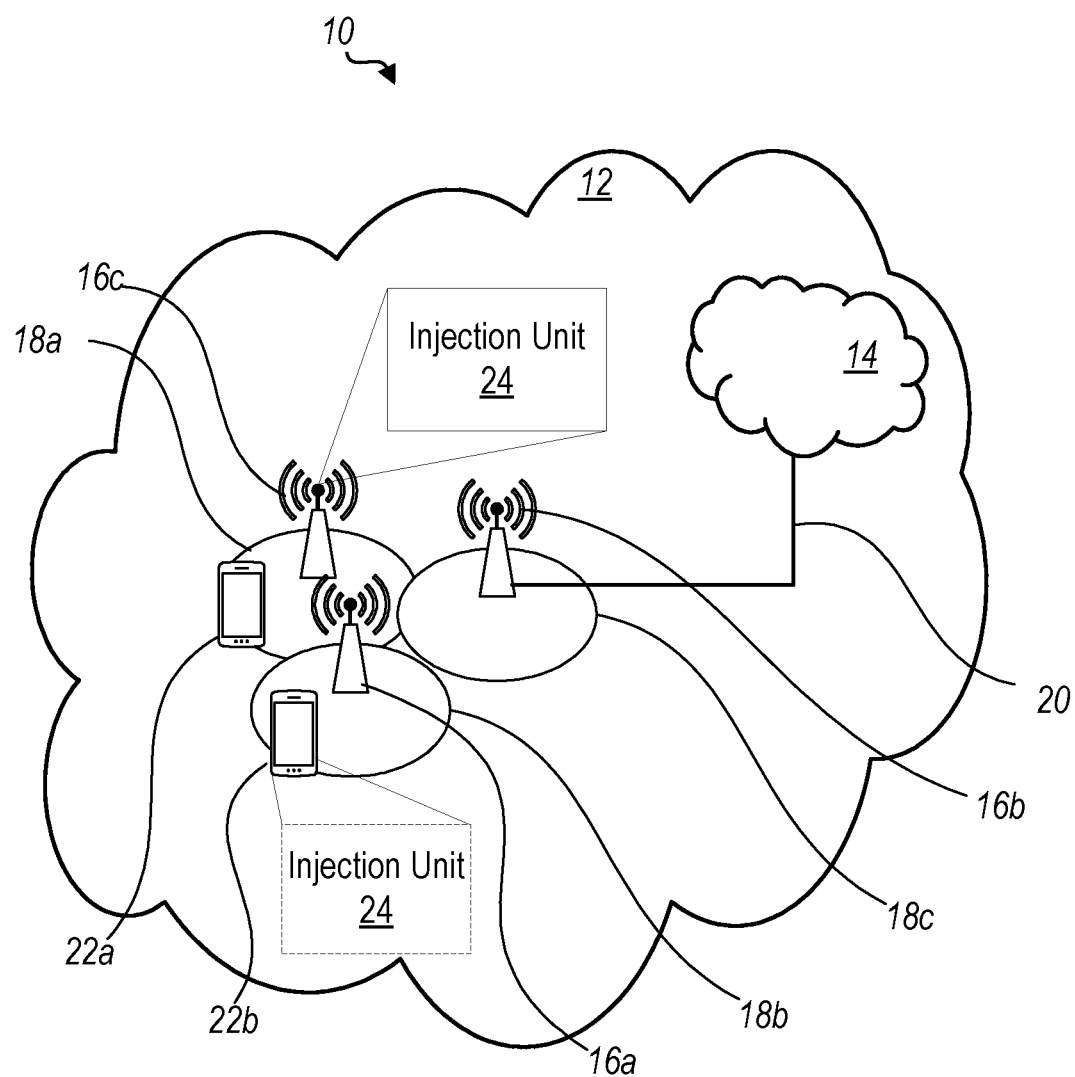
FIG. 2 is a schematic diagram of a communication system according to the principles in the present disclosure.

Returning to the drawing figures, in which like elements are designated by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of first radio nodes 16a, 16b, 16c (referred to collectively as first radio node 16), such as NBs, eNBs, gNBs or other types of wireless access points, each defining a corresponding coverage area 18a, 18b, 18c (referred to collectively as coverage areas 18). Each first radio node 16a, 16b, 16c is connectable to the core network 14 over a wired or wireless connection 20. A second radio node 22a located in coverage area 18a is configured to wirelessly connect to, or be paged by, the corresponding first radio node 16c. A second radio node 22b in coverage area 18b is wirelessly connectable to the corresponding first radio node 16a. While a plurality of second radio node 22a, 22b (collectively referred to as second radio node 22) are illustrated in this example, the disclosed embodiments are equally applicable to a situation where a sole second radio node 22 is in the coverage area or where a sole second radio node 22 is connecting to the corresponding first radio node 16. Note that although only two second radio nodes 22 and three first radio nodes 16 are shown for convenience, the communication system may include many more second radio nodes 22 and first radio nodes 16.

Also, it is contemplated that a second radio node 22 can be in simultaneous communication and/or configured to separately communicate with more than one first radio node 16 and more than one type of first radio node 16. For example, a second radio node 22 can have dual connectivity with a first radio node 16 that supports LTE and the same or a different first radio node 16 that supports NR. As an example, second radio node 22 can be in communication with an eNB for LTE/E-UTRAN and a gNB for NR/NG-RAN.

The communication system of FIG. 2 as a whole enables connectivity between one of the connected second radio nodes 22a, 22b and first radio node 16. A first radio node 16 is configured to include an injection unit 24 which is configured to inject a signal into a time window, and perform at least one function using the injected signal, as described herein. In one or more embodiments, a second radio node 22 may optionally include injection unit 24 as described above.

In accordance with an embodiment, example implementations of the second radio node 22 and first radio node 16 discussed in the preceding paragraphs will now be described with reference to FIG. 3. The communication system 10 further includes a first radio node 16 provided in a communication system 10 and comprising hardware 26 enabling it to communicate with the second radio node 22. The hardware 26 may include a communication interface 28 for setting up and maintaining a wired or wireless connection with an interface of a different communication device of the communication system 10, as well as a radio interface 30 for setting up and maintaining at least a wireless connection 31 with a second radio node 22 located in a coverage area 18 served by the first radio node 16. The radio interface 30 may be formed as or may include, for example, one or more RF transmitters, one or more RF receivers, and/or one or more RF transceivers.

In the embodiment shown, the hardware 26 of the first radio node 16 further includes processing circuitry 32. The processing circuitry 32 may include a processor 34 and a memory 36. In particular, in addition to or instead of a processor, such as a central processing unit, and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first radio node 16 further has software 38 stored internally in, for example, memory 36, or stored in external memory (e.g., database, storage array, network storage device, etc.) accessible by the first radio node 16 via an external connection. The software 38 may be executable by the processing circuitry 32. The processing circuitry 32 may be configured to control any of the methods and/or processes described herein and/or to cause such methods, and/or processes to be performed, e.g., by first radio node 16. Processor 34 corresponds to one or more processors 34 for performing first radio node 16 functions described herein. The memory 36 is configured to store data, programmatic software code and/or other information described herein. In some embodiments, the software 38 may include instructions that, when executed by the processor 34 and/or processing circuitry 32, causes the processor 34 and/or processing circuitry 32 to perform the processes described herein with respect to first radio node 16. For example, processing circuitry 32 of the first radio node 16 may include injection unit 24 configured to inject a signal into a time window, and perform at least one function using and/or based on the injected signal, as described herein.

The communication system 10 further includes the second radio node 22 already referred to. The second radio node 22 may have hardware 40 that may include a radio interface 42 configured to set up and maintain a wireless connection 31 with a first radio node 16 serving a coverage area 18 in which the second radio node 22 is currently located. The radio interface 42 may be formed as or may include, for example, one or more RF transmitters, one or more RF receivers, and/or one or more RF transceivers.

The hardware 40 of the second radio node 22 further includes processing circuitry 44. The processing circuitry 44 may include a processor 46 and memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second radio node 22 may further comprise software 50, which is stored in, for example, memory 48 at the second radio node 22, or stored in external memory (e.g., database, storage array, network storage device, etc.) accessible by the second radio node 22. The software 50 may be executable by the processing circuitry 44. The software 50 may include a client application 52. The client application 52 may be operable to provide a service to a human or non-human user via the second radio node 22. In providing the service to the user, the client application 52 may receive request data and provide user data in response to the request data. The client application 52 may interact with the user to generate the user data that it provides.

The processing circuitry 44 may be configured to control any of the methods and/or processes described herein and/or to cause such methods, and/or processes to be performed, e.g., by second radio node 22. The processor 46 corresponds to one or more processors 46 for performing second radio node 22 functions described herein. The second radio node 22 includes memory 48 that is configured to store data, programmatic software code and/or other information described herein. In some embodiments, the software 50 and/or the client application 52 may include instructions that, when executed by the processor 46 and/or processing circuitry 44, causes the processor 46 and/or processing circuitry 44 to perform the processes described herein with respect to second radio node 22. For example, the processing circuitry 44 of the second radio node 22 may optionally include an injection unit 24 configured to inject a signal into a time window, and optionally perform at least one function using the injected signal, as described herein.

Although embodiments are described herein with reference to certain functions being performed by first radio node 16 and/or second radio node 22, it is understood that the functions can be performed in other network nodes and elements. It is also understood that the functions of the first radio node 16 and/or second radio node 22 can be distributed across the network cloud, such as the internet or access network backhaul network, so that other nodes can perform one or more functions or even parts of functions described herein.

Figure 3:
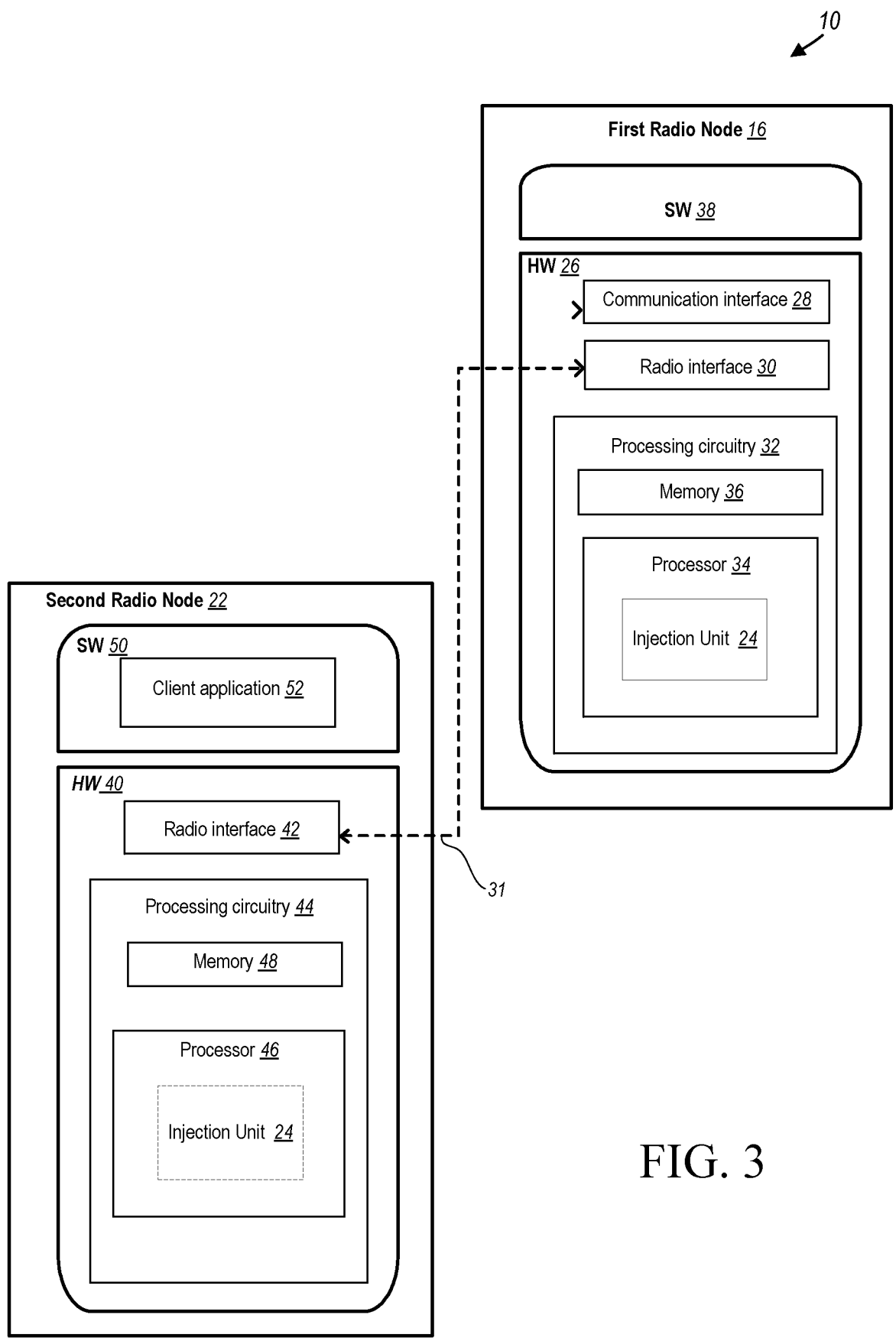
FIG. 3 is a block diagram of the communication system including first and second radio nodes according to some embodiments of the present disclosure.

In some embodiments, the inner workings of the first radio node 16 and second radio node 22 may be as shown in FIG. 3 and independently, the surrounding network topology may be that of FIG. 2. The wireless connection 31 between the second radio node 22 and the first radio node 16 is in accordance with the teachings of the embodiments described throughout this disclosure. One or more of the various embodiments improve the performance of services provided to the second radio node 22 in which the wireless connection 31 may form the last segment in the connection. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. In some embodiments, the cellular network also includes the first radio node 16 with a radio interface 30. In some embodiments, the first radio node 16 is configured to, and/or the first radio node 16's processing circuitry 32 is configured to perform the functions and/or methods described herein for preparing/initiating/maintaining/supporting/ending a transmission to the second radio node 22, and/or preparing/terminating/maintaining/supporting/ending in receipt of a transmission from the second radio node 22. In some embodiments, the second radio node 22 is configured to, and/or comprises a radio interface 42 and/or processing circuitry 44 configured to perform the functions and/or methods described herein for preparing/initiating/maintaining/supporting/ending a transmission to the first radio node 16, and/or preparing/terminating/maintaining/supporting/ending in receipt of a transmission from the first radio node 16.

Although FIGS. 2 and 3 show various "units" such as injection unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
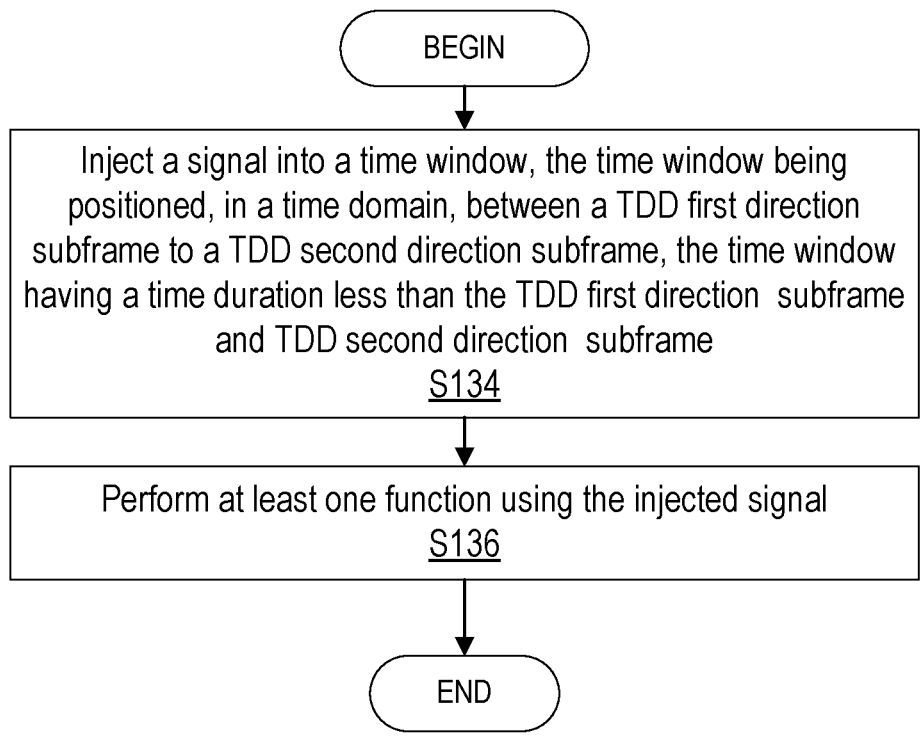
FIG. 4 is a flow diagram of an example injection process in accordance with some embodiments of the present disclosure.

FIG. 4 is a flowchart of an example process in first radio node 16 for injecting a signal and performing at least one function based on the injected signal, as described herein. First radio node 16 such as via processing circuitry 32 is configured to inject a signal into a time window where the time window is positioned, in a time domain, between a TDD first direction subframe to a TDD second direction subframe and the time window has a time duration less than the TDD first direction subframe and TDD second direction subframe, as described herein (Block S134). In one or more embodiments, the time window has a time duration less than the downlink/uplink DL/UL subframe offset. First radio node 16 such as via processing circuitry 32 is configured to perform at least one function using and/or based on the injected signal, as described herein (Block S136).

According to one or more embodiments, the "radio node" as used below is one of a base station 16 and user equipment 22. According to one or more embodiments, the time window is part of an offset region that includes a time period in which the radio node (16, 22) can switch between a receiving mode and a transmitting mode. According to one or more embodiments, the injection of the signal into the time window occurs after the time period in which the radio node (16, 22) can switch between a receiving mode and a transmitting mode.

According to one or more embodiments, the offset region is defined by a transition from the TDD first direction subframe to TDD second direction subframe. According to one or more embodiments, the at least one function includes one of an internal operation of the radio node and an external operation of the radio node. According to one or more embodiments, the internal operation of the radio node includes at least one of an antenna calibration, antenna branch monitoring and Voltage Standing Wave Ratio, VSWR, detection.

According to one or more embodiments, the external operation of the radio node includes at least one over-the-air based operation with at least one cooperating node. According to one or more embodiments, the signal is injected into the time window without overwriting radio access technology user or control data to be transmitted by the radio node. According to one or more embodiments, the first direction is an uplink or downlink direction, the second direction being opposite the first direction. For example, the first direction is an uplink direction and the second direction is a downlink direction. In another example, the first direction is a downlink direction and the second direction is an uplink direction.

According to one embodiment, processing circuitry 32 is configured to inject a downlink antenna calibration signal into a time window where the time window is positioned, in a time domain, between a TDD uplink subframe to a TDD downlink subframe, and the time window has a time duration less than the TDD uplink subframe and TDD downlink subframe. Processing circuitry 32 is further configured to perform at least one antenna calibration function using the injected signal.

For example, in an internal operation, processing circuitry 32 may listen for an injected signal at a point before the injected signal is to leave to the antennas of the first radio node 16. The processing circuitry 32 may then analyze, compare, etc., the internally detected injected signal in order to perform at least one function such as antenna calibration. In one or more embodiments, the analysis involved in antenna calibration is performed in a similar manner as is known in the art but where such analysis is using the injected signal as described herein, thereby providing antenna calibration without affecting data throughput. In a more general sense, in one or more embodiments, the methodology for performing the analysis and for performing the at least one function may be based on existing methodologies except that the injected signal used in the analysis is injected, as described herein, so as not to negatively affect data throughput.

In another example, in an external operational, the injected signal may be transmitted over the air, via one or more antennas such as for performing at least one function such as time alignment. The injected signal transmitted over the air may not negatively affect communications with the second radio node 22 since the second radio node 22 would likely not be expecting any communications from first radio node 16 that is transitioning between modes or between uplink (UL)/downlink (DL). In other words, the injected signal is inserted into a time window for performing at least one external operation such as an over the air function.

Further, while the above description relates to signal injection at the first radio node 16, the teachings described herein are equally applicable to a second radio node 22, e.g., user equipment (UE), performing the signal injection and/or at least one functions using the injected signal. The second radio node 22 also has its own specification-mandated requirements for maximum transition time from transmit full power to power off. If the second radio node 22 can transition faster than the time allotted by the standard/specification, the second radio node 22 may use this remaining time window in conjunction with the time offset between the downlink and uplink frame structure for injection of special purpose signals (that conform to emission restrictions). For example, second radio node 22 may include injection unit 24 for performing the process described above with respect to FIG. 4.

As described above, there are time regions in the TDD waveform on switch from UL to DL that may be exploited for internal and/or external operations that may require use of the transmit path when traffic related signals may not be present.

The discussion below is described with examples directed to 4G (LTE) and 5G (NR) type OFDM waveform structures and signals. However, the teachings herein are generally applicable to a wide range of TDD type structures and standards.

Figure 5:
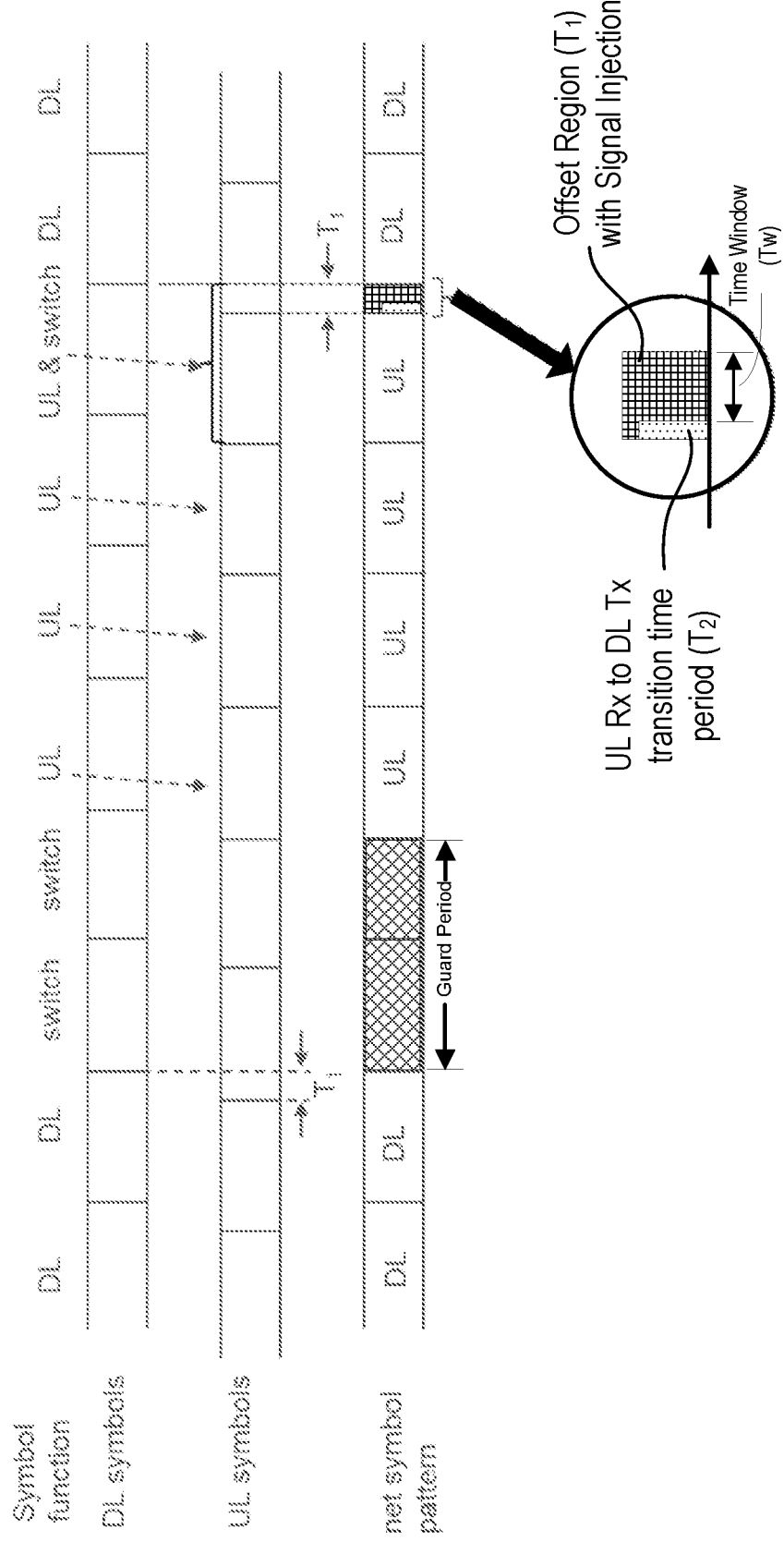
FIG. 5 is a block diagram of Time Division Duplex (TDD) timing that incorporates a signal injection in accordance with some embodiments of the present disclosure.

FIG. 5 is a block diagram of a modified version of the diagram of FIG. 1. In FIG. 5, the offset region ($T_1$) in FIG. 1 has been modified to include for and allow signal injection. The offset region of FIG. 5, may still provide all the functionality of the offset region of FIG. 1, but now also provides for signal injection, as described herein. For example, a signal such as a non-standard signal, calibration signal, etc. may be injected in the offset region such as in the time window ($T_w$) after the transition time period from UL receiving to DL transmission, i.e., after $T_2$, as described in detail below. In one or more embodiments, the time window ($T_w$) has a time duration of $T_1-T_2$ and/or has a time duration less than the offset region.

Having generally described arrangements for injecting a signal into a time window ($T_w$), and perform at least one function using and/or based on the injected signal, details for these arrangements, functions and processes are provided as follows, and which may be implemented by the first radio node 16 and/or second radio node 22.

UL to DL gap

There is a time window ($T_w$) when DL related operations (non-standard signal injection) can be performed. The size of this time window ($T_w$) is:

$T_w=T_1-T_2$, where $T_1$=UL/DL slot offset (also referred to as offset region), as described in one or more communication standards such as 3GPP standards, and $T_2$=time required for radio hardware (HW) UL→DL switchover.

In one or more embodiments, the above equations describe one or more aspect of the disclosure.

Example

In one existing system, DL antenna calibration for AAS injects training signals that overwrite traffic data, which, as described herein, can cause a negative throughput impact. In NR, the radio conforms to the NR requirements so that:

$T_2 \leq 10$ μs
$T_1=20.31$ μs (for LTE)
$T_w \geq 10.31$ μs

Assuming the calibration signal duration is 9 μs, based on the above numbers, this leaves time headroom of at least (10.31 μs–9 μs) 1.31 us after transition from UL to DL and after injection of the calibration signal. In one or more embodiments, the calibration signal may be configured such that at least a predefined amount of time headroom is left in order to help account for second radio node 22 timing uncertainty. Other calibration signal durations are possible in accordance with the principles of the disclosure. While the time window in FIG. 5 is illustrated as occurring after the UL Rx to DL Tx transition time period ($T_2$), in some embodiments if calibration of the receive channels are desired, the time window ($T_w$) may occur or be configured to occur before the UL Rx to DL Tx transition time period ($T_2$). Similarly, the calibration of the DL path could be executed by placing the time window ($T_w$), i.e., injection window, after the completion of the last DL symbol, but before internal switching from Tx to Rx and by stealing time from the provisioned transition time period ($T_2$). In one or more embodiments, internal switching may refer to switching of processing circuitry functionality and/or initiating of one or more components of the radio node such as to allow for transmission and/or reception functionality to be performed. It should be noted that in this example, an NR capable radio supporting LTE may use the UL-to-DL switch capabilities of NR, but of course apply the DL/UL offset of LTE.

In sum, the disclosure advantageously provides for signal injection in a time window ($T_w$) that would otherwise go unused where this time window ($T_w$) is part of an offset region that typically provides enough time for radio hardware to switch from UL to DL, or switch from receiving mode to transmission mode. In other words, the disclosure identifies and exploits available DL time in the TDD frame structure for injection of non-standard specific signals in the DL path. These injected signals may be used for a variety of applications such as internal and/or external operations such as DL antenna calibration, among others.

| Abbreviation | Explanation |
|---|---|
| AAS | Adaptive Antenna Systems |
| AC | Antenna Calibration |
| CP | cyclic prefix |
| DL | downlink |
| FDD | frequency division duplex |
| GP | guard period |
| LTE | long term evolution |
| mmW | milli-metre wave |
| NR | new radio |
| SCH | shared channel |
| SINR | Signal to interference plus noise ratio |
| $T_1$ | UL/DL slot offset as described in 3GPP |
| $T_2$ | time period required for radio HW UL→DL switchover |
| $T_w$ | time window available for injection of non-standard signals in DL |
| TDD | time division duplex |
| UE | Use equipment |
| UL | uplink |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A radio node for Time Division Duplex, TDD, communications, the radio node comprising processing circuitry configured to:
    inject a signal into a time window, the time window being positioned, in a time domain, between a TDD first direction subframe to a TDD second direction subframe, the time window having a time duration less than the TDD first direction subframe and TDD second direction subframe, the time window being part of an offset region that includes a time period in which the radio node is switchable from a receiving mode to a transmitting mode, the signal being configured such that a time headroom follows the injection of the signal into the time window, the time headroom having a duration configured to account for a timing uncertainty of a receiving radio node; and
    perform at least one function using the injected signal.

2. The radio node of claim 1, wherein the radio node is one of a base station and user equipment.

3. The radio node of claim 1, wherein the injection of the signal into the time window occurs after the time period.

4. The radio node of claim 1, wherein the offset region is defined by a transition from the TDD first direction subframe to TDD second direction subframe.

5. The radio node of claim 1, wherein the at least one function includes one of an internal operation of the radio node and an external operation of the radio node.

6. The radio node of claim 5, wherein the internal operation of the radio node includes at least one of an antenna calibration, antenna branch monitoring and Voltage Standing Wave Ratio, VSWR, detection.

7. The radio node of claim 5, wherein the external operation of the radio node includes at least one over-the-air based operation with at least one cooperating node.

8. The radio node of claim 5, wherein the signal is injected into the time window without overwriting radio access technology user or control data to be transmitted by the radio node.

9. The radio node of claim 1, wherein the first direction is an uplink or downlink direction, the second direction being opposite the first direction.

10. A method for a radio node for Time Division Duplex, TDD, communications, the method comprising:
    injecting a signal into a time window, the time window being positioned, in a time domain, between a TDD first direction subframe to a TDD second direction subframe, the time window having a time duration less than the TDD first direction subframe and the TDD second direction subframe;
    the time window being part of an offset region that includes a time period in which the radio node is switchable from a receiving mode to a transmitting mode, the signal being configured such that a time headroom follows the injection of the signal into the time window, the time headroom having a duration configured to account for a timing uncertainty of a receiving radio node; and performing at least one function using the injected signal.

11. The method of claim 10, wherein the radio node is one of a base station and user equipment.

12. The method of claim 10, wherein the injection of the signal into the time window occurs after the time period.

13. The method of claim 10, wherein the offset region is defined by a transition from the TDD first direction subframe to TDD second direction subframe.

14. The method of claim 10, wherein the at least one function includes one of an internal operation of the radio node and an external operation of the radio node.

15. The method of claim 14, wherein the internal operation of the radio node includes at least one of an antenna calibration, antenna branch monitoring and Voltage Standing Wave Ratio, VSWR, detection.

16. The method of claim 14, wherein the external operation of the radio node includes at least one over-the-air based operation with at last one cooperating node.

17. The method of claim 14, wherein the signal is injected into the time window without overwriting radio access technology user or control data to be transmitted by the radio node.

18. The method of claim 10, wherein the first direction is an uplink direction, the second direction being opposite the first direction.

19. A radio node for Time Division Duplex, TDD, communications, the radio node comprising processing circuitry configured to:

inject a downlink antenna calibration signal into a time window, the time window being positioned, in a time domain, between a TDD uplink subframe to a TDD downlink subframe, the time window having a time duration less than the TDD uplink subframe and TDD downlink subframe;

the time window being part of an offset region that includes a time period in which the radio node is switchable from a receiving mode to a transmitting mode, the downlink antenna calibration signal being configured such that a time headroom follows the injection of the downlink antenna calibration signal into the time window, the time headroom having a duration configured to account for a timing uncertainty of a receiving radio node; and perform at least one antenna calibration function using the injected downlink antenna calibration signal.

* * * * *